UNITED STATES PATENT OFFICE.

DE WATT PEPPER, OF NEW MILFORD, CONNECTICUT.

COMPOSITION OF MATTER FOR COATING BOXES MADE FROM PAPER, STRAW, OR PASTE BOARD.

SPECIFICATION forming part of Letters Patent No. 333,330, dated December 29, 1885.

Application filed July 22, 1885. Serial No. 172,324. (No specimens.)

*To all whom it may concern:*

Be it known that I, DE WATT PEPPER, a citizen of the United States, residing at New Milford, in the county of Litchfield and State of Connecticut, have invented certain new and useful Improvements in Composition of Matter for Coating Boxes Made from Paper, Straw, or Paste Board; and I do hereby declare the following to be a full, clear, and exact description of the invention, such as will enable others skilled in the art to which it appertains to make and use the same.

My invention relates to certain novel and useful improvements in the composition of matter to be used for interiorly coating boxes made from paper, straw, or paste board, said boxes to be used for containing any liquid or plastic or paste substance.

My composition consists of the following ingredients: Paraffine and bicarbonate of soda or alum, the proportion of the soda or alum being sufficient to harden the paraffine when applied to the box. These ingredients are to be thoroughly mingled by heating. The alum is not absolutely necessary, since the soda will harden the paraffine sufficiently to withstand the action of most liquids, paints, &c., but where considerable heat is to be withstood alum is used. There are several substances—such as glue and gum-arabic—which may be added to my composition to render the latter more impervious to turpentine, but this is not necessary, as the paraffine and soda are unaffected by turpentine or any of the usual solvents. Of course the soda combined with the paraffine has additional advantages beyond the mere hardening of the paraffine, since the oil and odor of the latter are entirely neutralized, and the box thereby rendered suitable to contain liquids to be used as food.

I do not wish to be understood as claiming a water-proof box, as the latter would not answer the purpose of my invention unless the water-proof composition was odorless, free from oil, and perfectly hard.

What I claim as new, and desire to secure by Letter Patent, is—

A composition of matter for interiorly coating paper, paste, or straw board boxes, the essential ingredients of which are paraffine and bicarbonate of soda, combined as specified.

In testimony whereof I affix my signature in presence of two witnesses.

DE WATT PEPPER.

Witnesses:
S. S. WILLIAMSON,
H. T. SHELTON, Jr.